Patented Dec. 8, 1942

2,304,767

UNITED STATES PATENT OFFICE 2,304,767

TREATMENT OF ORGANIC MATERIALS

John Ross and Dwight James Potter, New York, N. Y., assignors to Colgate-Palmolive-Peet Company, Jersey City, N. J., a corporation of Delaware No Drawing. Application June 29, 1939, Serial No. 281,885

12 Claims. (Cl. 260—513)

This invention relates to the preparation of relatively pure organic chemical compounds, and more particularly to the purification of organic sulphonyl halides.

In the preparation of organic sulphonyl halides it is often found that unreacted materials and various organic by-products are mixed with the sulphonyl halide products. These impurities may comprise, among other things, hydrocarbons of a paraffinic nature and halogenated hydrocarbons. Because of the solvent action of the organic sulphonyl halides, appreciable quantities of the unreacted hydrocarbons, halogenated hydrocarbons, and similar materials are held in solution and hence cannot be readily separated by direct physical methods.

The presence of unreacted hydrocarbons or halogenated hydrocarbons often has definite detrimental effects upon the efficiency of the organic sulphonates prepared from these sulphonyl halides, which is shown by a marked lowering of their wetting, washing and emulsifying efficiency. In addition, water solutions of the resulting sulphonates containing such unsulphonated oil are often characterized by an opalescence even when the concentration is very low. For these and other reasons it is obviously highly desirable for certain purposes to remove the water-insoluble organic materials from the sulphonated product or from the organic sulphonyl halides before their conversion to sulphonated products.

The organic sulphonyl halides are usually converted to the corresponding organic sulphonic acid salts by boiling with aqueous alkali. This step is usually accompanied by operating difficulties when high molecular weight hydrocarbons, alcohols, and like materials are present, since these compounds cause difficultly controllable foaming and may possibly enter into reaction with the organic sulphonyl halides in the presence of the alkali. Some of the water insoluble impurities separate out from the aqueous solution, but, because of the solubilizing and emulsifying action of the sulphonate, appreciable quantities of the hydrocarbon-like materials remain dispersed or dissolved therein. The separation of these remaining impurities is a troublesome problem. A possible method is to dilute the crude sulphonate salts with water, thus decreasing the miscibility of the unreacted material, and this dilute water solution is then extracted with a volatile water-immiscible solvent to remove the remaining hydrocarbon-like material. Additional unsulphonated materials may form a supernatant layer directly upon this dilution, which layer is removed before extracting the water layer containing dissolved sulphonic acid with the organic liquids.

This method of solvent extraction of the aqueous solution of sodium sulphonate has generally been found to be inefficient, laborious, expensive and hazardous. The volume of aqueous solution of sulphonate to be extracted is obviously much greater than the original organic sulphonyl halides, thus rendering the treatment of the former more time-consuming and burdensome. It is expensive because large amounts of organic solvents are commonly required as extractants, examples being ether, gasoline and benzene. The emulsifying action of the sulphonate salts tends to emulsify the solvent solution in the aqueous layer which obviously reduces the efficiency of the extraction process.

It is not possible to similarly treat the organic sulphonyl halides, as such, with common organic solvents, since the organic solvents generally employed for dissolving out the unreacted hydrocarbon-like material and undesirable by-products are also solvents for the organic sulphonyl halides. Furthermore, certain of the common solvents would react with the organic sulphonyl halides and hence would be wholly unsatisfactory.

It is an object of the invention disclosed herein to remove the organic sulphonyl halides from the unreacted hydrocarbon-like materials and other organic impurities. Another object is to provide an inexpensive, safe and simple process for extracting organic sulphonyl halides from organic impurities such as unreacted hydrocarbons, halogenated hydrocarbons and the like, by treating these compounds with liquid sulphur dioxide and separating the liquid sulphur dioxide phase formed from the hydrocarbons and halogenated hydrocarbons.

It is also an object of this invention to prepare organic sulphonyl halides substantially free from unsaponifiable constituents in order that the hydrolysis of the salts can be readily controlled and undesirable condensation reactions with impurities do not occur.

A still further object is the purification of organic sulphonyl halides obtained by the action of sulphur dioxide and halogen or equivalent agents on hydrocarbon-containing materials, by treating the reaction mass with sulphur dioxide and a low-boiling, sulphur-dioxide-immiscible solvent for hydrocarbons, halogenated hydrocarbons, or the like.

Other objects of the invention will be apparent from the more detailed description given hereafter.

It has now been discovered that liquid sulphur dioxide can be used with advantage as a solvent medium for separating organic sulphonyl halides from unreacted hydrocarbon-like materials and the halogenated derivatives thereof in the reaction product obtained when hydrocarbons or like materials are reacted with sulphur dioxide and a halogen, or equivalent agents. It has been found that organic sulphonyl halides are relatively soluble in liquid sulphur dioxide, whereas the unreacted or merely halogenated materials are insoluble or sparingly soluble therein. Accordingly, this invention in its broadest aspects contemplates the treatment of organic sulphonyl halides which contain hydrocarbons and like materials as impurities, with liquid sulphur dioxide (preferably with another solvent such as hexane) and separating the liquid sulphur dioxide phase which is formed. By treatments in this manner, substantially all the impurities are removed and the organic sulphonyl halide are obtained substantially pure, and consequently more desirable, because of the unimpaired detergent properties of the sulphonates derived therefrom. The liquid sulphur dioxide may be readily separated from the organic sulphonyl halides by vaporization and condensation, and re-used for treatment of additional material, or for any other purpose.

The process of this invention may be performed by adding about an equal volume of liquid sulphur dioxide to the organic sulphonyl halide reaction mixture and then an equal volume of hexane. The order of adding liquid sulphur dioxide and hexane may be reversed, or they may be used simultaneously. The mixture separates sharply into two liquid phases. One of the phases consists mainly of liquid sulphur dioxide and contains the major portion of the organic sulphonyl halide, and the other phase contains the hexane solution of hydrocarbon-like material and halogenated derivatives thereof. The liquid sulphur dioxide layer is more dense than the hexane layer, hence the latter forms the upper layer. It is desirable to form layers having widely different specific gravities in order to promote separation.

The liquid sulphur dioxide phase or layer may be separated by known methods, and will be found to contain most of the organic sulphonyl halides. It may be rewashed with additional hexane to cause more complete purification. The hexane solution contains most of the impurities and may be successively extracted or washed with additional liquid sulphur dioxide until it is substantially free of organic sulphonyl halides.

The resulting organic sulphonyl halides are hydrolyzed to yield a sulphonate product relatively free from oil and other organic impurities. It has been found that the hydrolysis process is more easily controlled when performed with these purified organic sulphonyl halides substantially free from heavy hydrocarbons, alcohols, halogenated hydrocarbons and alcohols, and like materials.

The process of this invention lends itself to continuous extraction procedure by dilution of the mixture with one solvent and countercurrent washing with the other solvent, which may be most effectively and economically carried out.

The principle of this separation can be extended by using solvents other than liquid sulphur dioxide or by introducing other solvents which are soluble in the liquid sulphur dioxide phase, which will increase the solubility of the organic sulphonyl halides contained therein or will depress the solubility of the impurities in the liquid sulphur dioxide.

It is possible to introduce into the mixture before or during extraction, other liquid sulphur dioxide-soluble materials that are desired to be retained in the final sulphonate product. For example, if petroleum sulphonic acids, or even inorganic substances are to be incorporated into the final reaction product, these materials may be added directly with the solvents to the organic sulphonyl halides to be extracted.

We prefer to operate within a range of from about $-30°$ C. to about $+50°$ C., although lower or higher temperatures may be employed. The process may be carried out at higher temperatures, but it must be recognized that under such conditions of higher temperatures and pressures technical difficulties such as are due to corrosion are increased. When operating at higher temperatures and pressures it is usually necessary to employ an autoclave or similar pressure apparatus.

For a fuller understanding of the nature and objects of the invention, reference should be had to the following examples which are given merely to illustrate the invention and are not to be construed in a limiting sense:

Example I 185 grams of paraffin wax are treated with a 2:1 mixture of $SO_2$ and $Cl_2$ at a temperature of about $60-90°$ C. until the increase in weight is about 225 grams. 350 grams of the resulting colorless, viscous oil is transferred to a vacuum-walled separatory funnel and about 300 grams by volume of liquid sulphur dioxide and about 200 grams by volume of hexane are mixed therewith. After stirring for a short time, the viscous oil dissolves in the solvents. The liquid sulphur dioxide layer is separated from the hexane layer which is then washed successively with several portions of fresh liquid sulphur dioxide until about a liter of liquid sulphur dioxide solution is accumulated. The combined liquid sulphur dioxide solutions are washed with several small portions of hexane. Evaporation of the solvents from the liquid sulphur dioxide layer leaves about 327 grams by weight of a greyish, very viscous oil, which dissolves completely in boiling 10% NaOH solution to give a clear solution of a sodium sulphonate substantially free of unsaponifiable material.

Example II 188 parts by weight of paraffin wax are treated with a 1:1 mixture of $SO_2$ and $Cl_2$ at about $60-90°$ C. until there is an increase in weight of about 197 parts. 350 parts of the resulting grey oil are extracted with liquid sulphur dioxide and hexane very much as in the previous example. Evaporation of the sulphur dioxide layer leaves a residue of 325 parts by weight of sulphonyl chloride. By evaporation of the hexane layer, 14 parts by weight of residue are left of which 12 parts by weight are unsaponifiable being substantially insoluble in boiling caustic alkali.

Example III 151 parts by weight of cetyl alcohol are treated at about $60-90°$ C. with a 2:1 mixture of $SO_2$ and $Cl_2$ until there is a gain in weght of 75 parts and 69 parts by weight of chlorine have been passed in. 223 parts by weight of this dark oil are subjected to liquid $SO_2$-hexane extraction in the general manner described above. Evaporation of the SO₂ solution leaves a residue of 121.5 parts by weight which, when boiled with caustic and then extracted with ether, is found to contain only a minor quantity of unsaponifiables.

Although hexane is given as a suitable solvent immiscible with liquid sulphur dioxide, other solvents may be similarly employed such as other aliphatic hydrocarbons, e. g., propane, butane, pentane, heptane, octane, nonane, petroleum ethers, various other solvents which are immiscible with liquid sulphur dioxide and do not freeze in contact therewith under the pressure and temperature conditions of treatment, and mixtures thereof.

Other solvents that are soluble in liquid sulphur dioxide under the conditions of treatment which may assist in the solution of the sulphonyl halide but which increase the insolubility of the impurities or at least do not substantially decrease said insolubility therein, may be added. Such solvents include ethyl sulphates, methyl sulphates, butyl sulphates, and the like.

Although the treatment of sulphonyl chlorides of paraffin wax and alcohols is specifically disclosed, it is apparent that other sulphonyl halides can be similarly treated including those prepared by treatment of paraffins, olefins, aliphatic alcohols, aliphatic acids and the corresponding cycloaliphatic derivatives. The sulphonyl halides can be prepared by any method.

The sulphonate products obtained from the material prepared in accordance with the present invention, either as acids or salts, have good wetting, solubilizing, deterging, sudsing, water-softening, dispensing, emulsifying, penetrating, and equalizing properties. Since their calcium and magnesium salts are water-soluble, they operate efficiently in hard as well as in soft water. They are good wetting agents both in hot and cold treating baths, and function effectively in the presence of large quantities of inorganic salts.

Although the new materials possess unusual deterging, sudsing, and water-softening properties by themselves, their action may be augmented by the addition of any of the common auxiliary agents used in soap and detergent compositions. Suitable addition agents are other emulsifying agents including soaps, rosinates, long-chain alcohol sulphates, monoglyceride monosulphates, sulphonated mineral oil extracts, turkey red oil, lecithin, glycerolamines, diethanolamine and triethanolamine and their soaps; alkaline soap builders such as sodium carbonate, sodium silicate, sodium phosphate, and borax; water-soluble, water-softening phosphorous compounds of the type of tetraphosphoric, pyrophosphoric or hexametaphosphoric acid and their alkali metal, ammonia, and amine salts or alkyl esters; coloring matter such as dyes, lakes, pigments; abrasives and fillers such as silica, pumice, feldspar, precipitated chalk, infusorial earth, bentonite, talc, starch, and air; liquids including carbon tetrachloride, perchlorethylene, trichlorethylene, glycerine, ethyl alcohol, glycol, tetrahydrofurfuryl alcohol; phenol, cyclohexanol, water, tetralin, pine oil, mineral oil, mineral oil extracts, and naptha; perfumes and deodorants; fats, oils, fatty acids, monoglycerides, vitamins, waxes, gums, glue, resins; germicides such as phenol mercury chloride, phenyl mercury nitrate, phenyl mercury chloride, methyl ester of hydroxy benzoic acid, and mercuric chloride, styptics such as aluminum chloride and cephalin; any of the common water-soluble salts such as sodium sulphate, chloride, acetate, bicarbonate, sesquicarbonate, hypochlorite, thiosulphate, hydrosulphite, and hyposulphate, or the corresponding ammonium and potassium salts thereof. The type of addition agent to be used, of course, will depend on the ultimate use of the new composition.

The final composition, with or without one or more addition agent, may be formed into beads, flakes, bars, chips, crystals, powders, solutions, liquid or plastic emulsions, pastes, creams, salves, or any other forms desired. The ingredients may be mixed by any of the common methods such as grinding stirring, kneading, crutching, fusion, and drying by rolls, spray or otherwise of mixed solutions.

The compositions may be used in various ways such as washing compositions for wood, metal, stone, glass, brick, masonry and painted surfaces; insecticides; cements; abrasive compositions; antiseptics; water-softeners; deodorants and disinfectants; water paints and polishes; sizes, glues, and adhesives such as shellac and casein compositions; liquid, solid and paste tooth and mouth detergents; laundry detergents and other textile agents including laundry blueing, bleaching, dyeing, softening, lubricating, and discharging compositions; depilatories; dust preventing compositions; fire extinguishing compositions; drain, lavatory and radiator cleaners; anti-freezing, anti-fogging, and anti-corrosion compositions; wood impregnants; electrolytic baths; etching compositions; cosmetics, shaving preparations, shampoos and hair-wave lotions; tanning agents and fat-liquors for leather; photographic solutions; paint, stain and grease removers; dry-cleaning compositions; rug cleaners; petroleum de-emulsifying compositions; fruit washing; fat splitting; preparation of dyes and dye intermediates; preparation of germicidal agents; preparation of resins and plasticizers; and any compositions requiring wetting, washing, emulsifying, penetrating, solubilizing, dispersing and like agents.

As many apparently widely different embodiments of this invention may be made without departing from the spirit and scope thereof, it is to be understood that the application is not limited to the specific proportions or embodiments thereof except as defined in the following claims.

We claim:

1. A process of purifying organic sulphonyl halides which comprises treating a composition containing an aliphatic sulphonyl halide with liquid sulphur dioxide, and separating the liquid sulphur dioxide phase from any material insoluble therein.

2. A process of concentrating organic sulphonyl halides which comprises treating a composition containing an aliphatic sulphonyl halide with liquid sulphur dioxide and another inert solvent, and separating the liquid sulphur dioxide phase from any material insoluble therein.

3. A process of purifying organic sulphonyl halides which comprises treating a composition containing an aliphatic sulphonyl halide with liquid sulphur dioxide and an inert solvent substantially immiscible in liquid sulphur dioxide under treating conditions, and separating the liquid sulphur dioxide phase from any material insoluble therein.

4. A process of purifying organic sulphonyl-halides which comprises treating a composition containing an aliphatic sulphonyl halide with liquid sulphur dioxide and an inert solvent miscible with liquid sulphur dioxide under the treating conditions, and separating the liquid sulphur dioxide phase from any material insoluble therein.

5. A process of purifying organic sulphonyl halides which comprising treating a composition containing an aliphatic sulphonyl halide with liquid sulphur dioxide and a low-boiling saturated hydrocarbon, and separating the liquid sulphur dioxide phase from any material insoluble therein.

6. A process of purifying organic sulphonyl halides which comprises contacting a composition containing an aliphatic sulphonyl halide with liquid sulphur dioxide and an inert solvent immiscible with liquid sulphur dioxide under the treating conditions, separating the liquid sulphur dioxide phase, contacting the liquid sulphur dioxide phase with an inert solvent immiscible therewith under the treating conditions, contacting the phase immiscible with liquid sulphur dioxide from the first treatment with additional liquid sulphur dioxide to remove residual organic sulphonyl halides.

7. A process of purifying organic sulphonyl halides which comprises contacting a composition containing an aliphatic sulphonyl halide with liquid sulphur dioxide and a low-boiling substantially saturated aliphatic hydrocarbon, separating the liquid sulphur dioxide phase, contacting the liquid sulphur dioxide phase with an inert solvent immiscible therewith under the treating conditions, contacting the phase immiscible with liquid sulphur dioxide from the first treatment with additional liquid sulphur dioxide to remove residual organic sulphonyl halides.

8. A process of purifying organic sulphonyl halides which comprises contacting a composition containing aliphatic sulphonyl halide with liquid sulphur dioxide and hexane, separating the liquid sulphur dioxide phase, contacting the liquid sulphur dioxide phase with hexane, contacting the phase immiscible with liquid sulphur dioxide from the first treatment with additional liquid sulphur dioxide to remove residual organic sulphonyl halides.

9. A process of purifying organic sulphonyl chlorides which comprises treating a composition containing an aliphatic sulphonyl chloride with liquid sulphur dioxide, and separating the liquid sulphur dioxide phase from any material insoluble therein.

10. The process which comprises reacting a nongaseous saturated hydrocarbon in the liquid state with admixed gaseous sulfur dioxide and chlorine, extracting the sulfonyl chlorides with liquid sulfur dioxide, removing the solvent and hydrolyzing the resulting products.

11. The process which comprises reacting a nongaseous, long chain aliphatic compound in the liquid state with admixed sulphur dioxide and chlorine, and extracting the resulting aliphatic sulphonyl chlorides with liquid sulphur dioxide.

12. The process which comprises reacting a nongaseous, long chain saturated aliphatic hydrocarbon in the liquid state with admixed sulphur dioxide and chlorine, and continuously extracting the resulting aliphatic sulphonyl chlorides formed with liquid sulphur dioxide.

JOHN ROSS.
DWIGHT JAMES POTTER.